US012164653B2

(12) United States Patent
Jensen et al.

(10) Patent No.: US 12,164,653 B2
(45) Date of Patent: Dec. 10, 2024

(54) METHOD AND SYSTEM FOR AUTHENTICATION AND AUTHORIZATION

(71) Applicant: VESTAS WIND SYSTEMS A/S, Aarhus N. (DK)

(72) Inventors: Jan Krogh Jensen, Hinnerup (DK); Jan Kern Hansen, Aarhus N (DK); Bruno Andre Lopes Ferreira, Rans (PT); Luis Miguel Teixeira, Aves (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 215 days.

(21) Appl. No.: 17/787,905

(22) PCT Filed: Dec. 16, 2020

(86) PCT No.: PCT/DK2020/050372
§ 371 (c)(1),
(2) Date: Jun. 21, 2022

(87) PCT Pub. No.: WO2021/129910
PCT Pub. Date: Jul. 1, 2021

(65) Prior Publication Data
US 2023/0013458 A1 Jan. 19, 2023

(30) Foreign Application Priority Data

Dec. 23, 2019 (EP) .................................... 19219427

(51) Int. Cl.
*G06F 21/60* (2013.01)
*G06Q 50/06* (2012.01)
*H04L 9/40* (2022.01)

(52) U.S. Cl.
CPC ........... *G06F 21/604* (2013.01); *G06Q 50/06* (2013.01); *H04L 63/08* (2013.01); *H04L 63/10* (2013.01); *H04L 63/102* (2013.01)

(58) Field of Classification Search
None
See application file for complete search history.

(56) References Cited

U.S. PATENT DOCUMENTS

| 2012/0185698 A1* | 7/2012 | Fiske | G06F 21/32 |
| | | | 713/186 |
| 2017/0257361 A1* | 9/2017 | Niemelä | H04L 9/3247 |
| 2019/0157816 A1* | 5/2019 | Duan | G06F 21/31 |

FOREIGN PATENT DOCUMENTS

| EP | 2765466 A1 | 8/2014 |
| WO | 2014153673 A1 | 10/2014 |
| WO | 2021129910 A1 | 7/2021 |

OTHER PUBLICATIONS

European Patent Office, Extended European Search Report for Application 19219427.2-1222 dated Apr. 20, 2017.

(Continued)

*Primary Examiner* — Kaveh Abrishamkar
(74) *Attorney, Agent, or Firm* — Patterson + Sheridan, LLP

(57) ABSTRACT

Techniques for authenticating and authorizing user access to a component of a power plant within a private network of a renewable power plant having wind turbine generators. One technique includes providing at a local computer system in the private network a list of credentials and authorizations representing a plurality of identifiers and authenticators of users and corresponding access authorizations. The local computer is in direct communication with components of the power plant and is configured to receive a request for access from a user via a computer interface in the component in the private network. If the requested access can be granted by consulting the list of credentials and authorizations, the grant is communicated from the local computer to the computer interface in the component, and in case access cannot be granted, a request for update of the list of (Continued)

credentials and authorizations is communicated from the local computer system to a central computer system outside the private network.

20 Claims, 3 Drawing Sheets

(56) References Cited

OTHER PUBLICATIONS

PCT, Notification of Transmittal of The International Search Report and The Written Opinion of The International Searching Authority, or The Declaration for Application PCT/DK2020/050372 dated Mar. 11, 2021.

\* cited by examiner

METHOD AND SYSTEM FOR AUTHENTICATION AND AUTHORIZATION

INTRODUCTION

The disclosure relates to a method of authenticating and authorising user access to a component of power plant within a private network.

BACKGROUND

Wind turbines normally have different control systems operated by an internal computer network. Safety and avoidance of hacking is an important issue.

SUMMARY

It is an object of embodiments of the disclosure to provide an improved method of authenticating and authorising user access to a component.

In a first aspect, the disclosure provides a method for authenticating and authorising user access to a component of a power plant within a private network of a renewable power plant comprising one or more wind turbine generators, wherein the method comprises:

providing at a local computer system in the private network a list of credentials and authorisations representing a plurality of identifiers and authenticators of users and corresponding authorisations, the local computer system being in direct communication with components of the power plant and being configured to receive a request for access from a user via a computer interface in the component in the private network;

checking if the requested access can be granted by consulting the list of credentials and authorisations, and in case access can be granted, communicating from the local computer system the grant to the computer interface in the component, and in case access cannot be granted, communicating a request for update of the list of credentials and authorisations at the local computer system from the local computer system to a central computer system outside the private network.

Since the local computer system is responsible for communicating the request, it is assured that communication is on the initiative of the local computer system. Consequently, data safety is increased while the risk of hacking and unwanted access to the power plant in the private network is considerably reduced, as all access including unwanted access may be denied.

Furthermore, it may be achieved that the local computer is self-maintained; i.e. that the local computer is maintained without external assistance and/or intervention. All maintenance including updating of the local computer may thus be carried out on the initiative of the local computer.

In may further be achieved, that the relevant information of the central computer, such as the list of credentials and authorisations may be provided close to the components that needs the information; i.e. at the local computer.

Security may further be enhanced as sensitive data in the form of the list of credentials and authorisations may be secured at the local computer instead of providing a high security level at each component.

In one embodiment, the private network may comprise autonomous execution software configured to execute the request. The autonomous execution software may be located at the local computer.

The component of the power plant may be a component of a wind turbine, a sensor within the private network, a wind turbine controller, another subsystem of the wind turbine, a power plant controller, a local SCADA server, a met mast (measurement tower carrying measuring instruments with meteorological instruments) or a component hereof, a component of a control station within the private network, a portable measuring device temporarily positioned in the private network, or other components associated with running, maintenance, and surveillance of the power plant. The component may be a component to which access is restricted, an access restricted component, and consequently a component to which authorisation credentials are required.

A local computer system is provided in the private network, and at the local computer system is provided a list of credentials representing a plurality of IDs of users and corresponding authorisations. The list may comprise credentials for each component for which authentication and/or authorisation is required.

Credentials are used to control access to information or other resources. 'Credentials' is understood at the combination of a user's identifier, such as an account number or name, and an authenticator, such as a secret password, biometrics (fingerprints, voice recognition, retinal scans), X.509, public key certificates, etc. In one embodiment, an identified may be associated with multiple authenticators.

'Authentication' is understood as the process of ensuring that a user is who the user says he/she is; i.e. comparing a claim of access eligibility (the provided credentials) to a local copy of the credentials.

'Authorisation' is understood as the process of establishing a list of functions a user can perform on a given system and/or a specific set of data to which access is provided. As an example, if a user wants to perform Administrator type tasks on a system, the user can be authorised to do so. According to the governance scheme relevant for the specific organisation, this may require approval by the system owner. Once authorised, the user can access the system, and perform administrative functions. Furthermore, in some systems, the user may only be able to read (see) certain subsets of data; i.e. the authorisations may be on both function and data (function: read/update access, data: assigned cases).

The local computer system is in direct communication with components of the power plant and is configured to receive a request for access from a user via a computer interface in the component in the private network.

'Private network' is understood as is common in the art and particularly as a network wherein restrictions are established to promote a secure environment, such wherein devices outside the private network cannot access it except via a selected strict subset of devices. A private network is understood to inherently comprise a plurality of devices (such as processors, computers, servers and/or clients) which are connected to each other within the private network.

'Power plant' is understood as is common in the art, and in particular as an entity capable of producing power, such as capable of (rated for) a production of at least 0.1 megawatt (MW), such as at least 1.0 MW, such as at least 10 MW. The power plant comprises one or more wind turbine generators (wherein a wind turbine generator may be abbreviated 'WTG' and is used interchangeably with 'wind turbine' which is generally known in the art), such as one or more horizontal axis wind turbines optionally each rated for at least 0.1 MW, and may in that case be referred to as wind power plant (WPP), and in case of the wind power plant comprising a plurality of wind turbines, it may be referred to as wind farm or wind park.

When a user wants to access a component, such log-in to the component, the local computer system receives a request for access from the user via the computer interface in the component in the private network. The local computer system checks if the requested access can be granted by consulting the list of credentials and authorisations. In case access can be granted, the local computer system communicates the grant to the computer interface in the component, whereby the user is logged into the component.

In case access cannot be granted based on the actual state of the local list of credentials and authorisations, the local computer system communicates a request for update of the list of credentials and authorisations at the local computer system to a central computer system outside the private network.

The central computer system may comprise a central list of credentials representing a plurality of identifiers and authenticators of users and corresponding authorisations. The central list may be updated with new users and associated credentials and authorisations and/or with new credentials and/or authorisations for existing users. The update of the central list at the central computer system may be carried according to a time schedule, such as once a week, once a day, every six hour, every second hour, once an hour, twice an hour, every 5 minutes, or even more often. Alternatively, the central list may be updated whenever a new user is created and/or whenever an authorisation credential is changed, whereby the central list may be up-to-date at all times or at least substantially at all times. It should be understood, that server downtime, maintenance, update of the central computer system may limit access and updating of the central computer system.

The method may comprise a step of updating the list of credentials and authorisations at the local computer system in response to the request from the local computer to the central computer system. Thus, when the local computer system requests an update, the update may be transferred to the local computer system, and the list of credentials and authorisations at the local computer system may by updated. To increase safety, it may be assured that only credentials relating to the specific private network is transferred in response to the request.

In one embodiment, the step of updating the list of credentials and authorisations may only be effectuated upon a request from the local computer system. Since the local computer system is responsible for communicating the request, it is assured that communication is on the initiative of the local computer system. The local computer system may consequently fetch the update itself instead of relying on updates being forwarded unrequested. Consequently, the data safety is increased while the risk of hacking and unwanted access to the power plant in the private network is considerably reduced.

Subsequent to the updating, a step of checking if the requested access can be granted may be carried out by consulting the updated list of authorisation credentials at the local computer system. If authorisation can be granted when consulting the updated list of credentials and authorisations, the local computer system communicates the grant to the computer interface in the component.

The method may comprise a step of denying access, if the requested access cannot be granted by consulting the updated list of authorisation credentials, whereby the user wanting to access, such as log-in to a component of the power plant will not be logged in, Thus, as the user has not been authorised to log-in to the specific component, log-in is not allowed, and the user will as an example be met by a message saying that user access is denied.

The method may comprise a further step of requesting updates to the list of authorisation credentials from the local computer system to the central computer system in accordance with a time schedule. Such as once a week, once a day, every six hour, every second hour, once an hour, twice an hour, every 10 minutes, or even more often. When requesting updates at a regular basis, it may be achieved that the list of credentials and authorisations at the local computer system most of the time comprises the newest credentials and authorisations. This may minimise the risk of downtime due to failure related to communication of the request for an update of the credentials and authorisations from the local computer system to the central computer system, e.g, if communication cannot be established.

In one embodiment, the central computer system may be configured for communication with a plurality of local computer systems, each being provided in a private network of separate renewable power plants. The central computer system may comprise credentials and authorisations for each of the plurality of local computer systems. The step of communicating a request for update of the list of credentials and authorisations at a specific local computer system may comprise a step of filtering of credentials at the central computer system to comprise credentials for the specific private network only. Thereby it may be ensured that only credentials relevant for the specific private network are transferred to the local computer system in response to the request.

In one embodiment, a single local computer system is located in the private network, which single local computer system may be configured for handling access to all access restricted components in the renewable power plant. Thus, the step of requesting authorisation via a computer interface in the component may be communicated to the single local computer system in the private network, the single local computer system being configured for handling access to all access restricted component of the renewable power plant. This may limit the risk of hacking, as only a single local computer system will need security protection of the stored credentials and authorisations at a high level, instead of having to protect a number of decentral local computer systems, each communication with a sub-set of components in the private network.

The central computer system may be encompassed in a second private network of an external data centre. The step of communicating the request from the local computer system to the central computer system may be carried out at least partly via a public network. As an example, it may be via a VPN tunnel.

The method may comprise a further step of validity testing the updated list of credentials and authorisations. The validity testing step may include checking whether the updated list of authorisation credentials is in the right format and not corrupted or tampered. This is typically done by comparing a cryptographic checksum of the sent data, generated at the central computer system, to a checksum that is calculated at the local computer system using the same method. The validity testing step may additionally or alternatively include checking whether the updated credentials and authorisations are received from the central computer system; i.e. that the sender of the credentials and authorisations is actually the sender which is said to be the sender to thereby validate the authenticity of the sender.

In a second aspect, the disclosure provides a system comprising:
- a power plant comprising:
  - one or more wind turbine generators, and
  - a private network,
- a local computer system placed internally within the private network, and
- a central computer system arranged outside the private network, wherein the system is arranged for carrying out a method according to the first aspect of the disclosure.

In a third aspect, the disclosure provides a computer program product comprising instructions to cause a system according to the second aspect to execute the steps of a method according the first aspect.

The first, second, and third aspects of the present disclosure may each be combined with any of the other aspects. These and other aspects of the invention will be apparent from and elucidated with reference to the embodiments described hereinafter.

BRIEF DESCRIPTION OF THE FIGURES

The method for authorising user access to a component of a power plant within a private network of a power plant and the corresponding system and computer program product according to the disclosure will now be described in more detail with regard to the accompanying figures. The figures show one way of implementing the present disclosure and is not to be construed as being limiting to other possible embodiments falling within the scope of the attached claim set.

DETAILED DESCRIPTION OF AN EMBODIMENT

It should be understood that the detailed description is given by way of illustration only, since various changes and modifications within the spirit and scope of the disclosure will become apparent to those skilled in the art from this detailed description.

Figure 1:
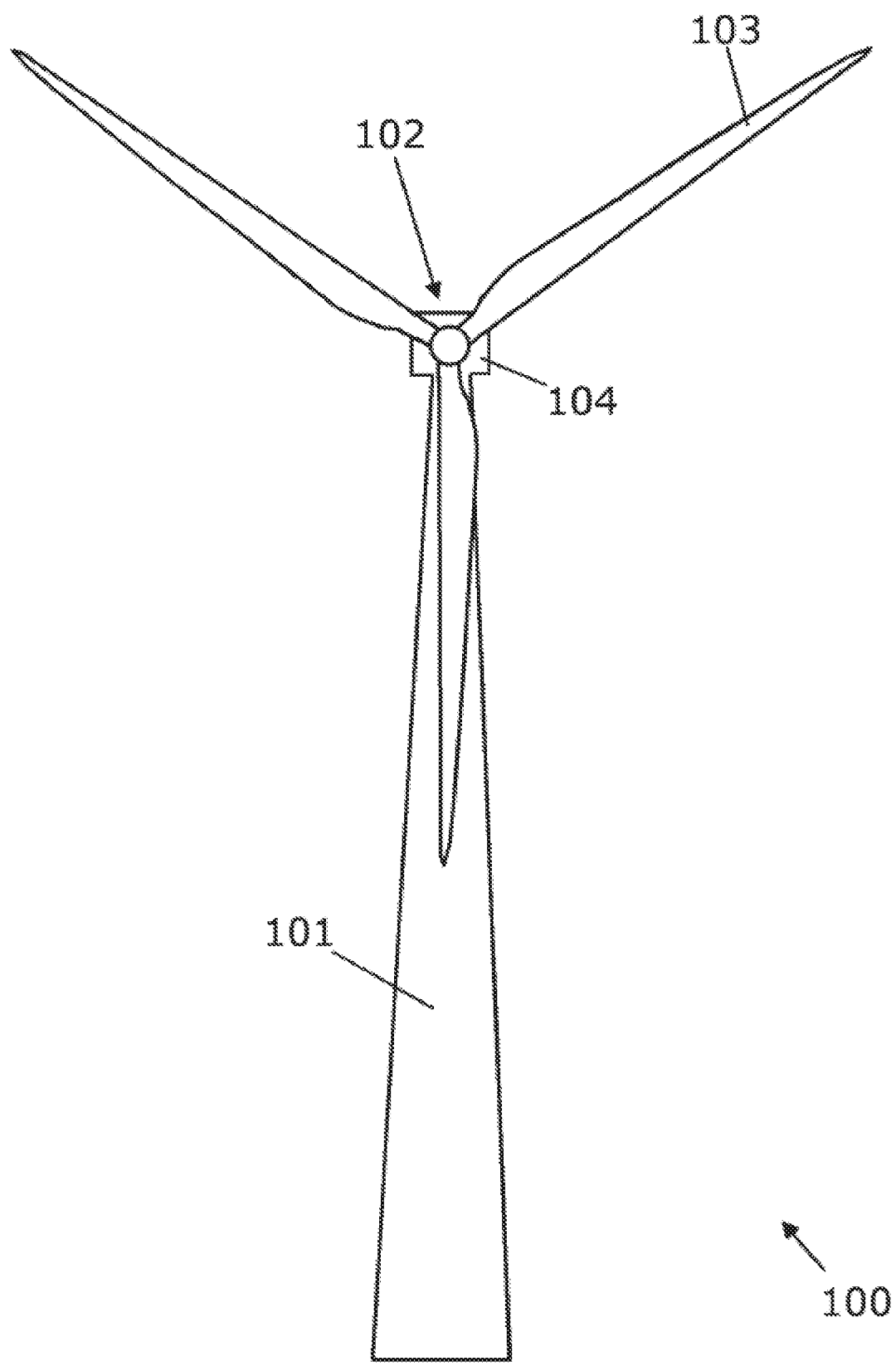
FIG. 1 illustrates a wind turbine.

FIG. 1 shows a wind turbine 100 (which may also be referred to as a wind turbine generator (WTG)) comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request. The blades 103 can be pitched in order to alter the aerodynamic properties of the blades, e.g. in order to maximize uptake of the wind energy and to ensure that the rotor blades are not subjected to too large loads when strong winds are blowing. The blades are pitched by a pitch system with a pitch force system controlled by a pitch control system, where the pitch force system includes actuators for pitching the blades dependent on a pitch request from the pitch control system. The wind turbine may be an asset of a (wind) power plant and the parts of the wind turbine, such as one or more of the actuators for pitching the blades, may similarly be seen as (sub-)assets of the wind turbine and power plant.

Figure 2:
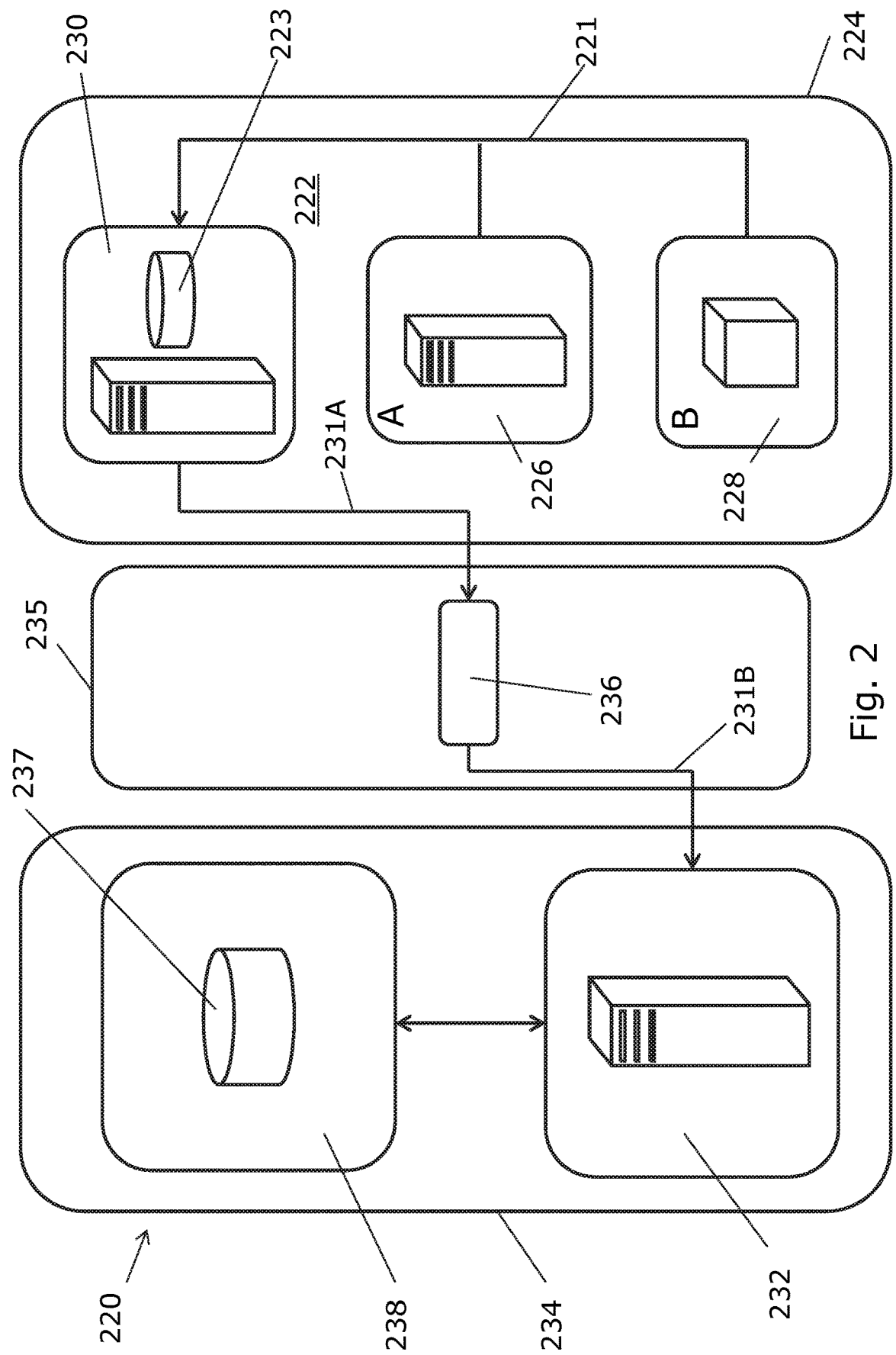
FIG. 2 illustrates an embodiment of a system according to an aspect of the disclosure.

FIG. 2 illustrates a system 220 comprising a power plant 222, where the power plant 222 comprises one or more wind turbine generators (not shown in FIG. 2, see FIG. 1), and a private network 224. The power plant 222 comprises a plurality of components 226, 228, where some of the components are separate components and where some forms part of a wind turbine. In the illustrated embodiment, the components are exemplified by component A 226 and component B 228, where component A 226 may be a controller in a wind turbine. The plurality of wind turbines may each comprises a controller. Component B 228 may as an example be a local SCADA server of the power plant 222, a computer in a met mast or a power plant controller.

A local computer system 230 is placed internally within the private network 224, whereas a central computer system 232 is arranged outside the private network. In the illustrated embodiment, the central computer system is placed within a second private network 234.

The system 220 is arranged for carrying out a method 350 for authenticating and authorising user access to a component 226, 228 within the private network 224.

The local computer system 230 is in direct communication with the components 226, 228 of the power plant 222 and is configured to receive a request for access from a user via a computer interface (not shown) in the component 226, 228 in the private network 224. The request for access is illustrated by the arrow 221.

The local computer system 230 checks if the requested access can be granted by consulting the list of credentials 223, and in case access can be granted, the grant is communicated from the local computer system 230 to the computer interface in the component 226, 228. The grant may include authorisations for component specific functions.

In case access cannot be granted, a request for update of the list of credentials and authorisations at the local computer system 230 is communicated from the local computer system 230 to a central computer system 232 outside the private network 224. In the illustrated embodiment, the step of communicating the request from the local computer system 230 to the central computer system 232 is carried out partly via a public network 235 in the form of a VPN tunnel 236. The public network 235 may be the internet. The request for update is illustrated by arrows 231A, 231B, Since the local computer system 230 is responsible for communicating the request 231A, 2316, it is assured that communication is on the initiative of the local computer system 230. Consequently, data safety is increased while the risk of hacking and unwanted access to the power plant 222 in the private network 224 is considerably reduced, as all access including unwanted access may be denied.

The central computer system 232 has access to a central list of credentials and authorisations 237 representing a plurality of identifiers and authenticators of users and corresponding authorisations. The central list 237 is stored in a central storage 238. Other computers in or outside the system 220 may have access to the central computer 232 and may be able to update the central list of credentials and authorisations 237. The central computer system 232 may be configured to validate the content of the list of credentials. The credentials and authorisations 237 representing a plurality of identifiers and authenticators of users and corresponding authorisations may have an expiry data associated with the identifier.

The central computer system 232 may be configured for communication with a plurality of local computer systems 230, each being provided in a private network 224 of separate renewable power plants. The central computer system 232 may comprise credentials and authorisations 237 for each of the plurality of local computer systems 230. When communicating a request for update of the list of credentials and authorisations 223 at a specific local computer system 230, the credentials and authorisations 237 at the central computer system 232 may be filtered whereby only credentials and authorisations 223 for the specific private network is transferred to the local computer system 230. Thus, the local list 223 is smaller than the central list 237, This results in high security even in cases where the local private network 224 may be compromised, as only the specific credentials and authorisations 223 for the specific power plant 222 has been compromised.

Security is further enhanced as sensitive data in the form of the list of credentials and authorisations 223 is secured at the local computer 230 instead of providing a high security level at each component 226, 228.

Figure 3:
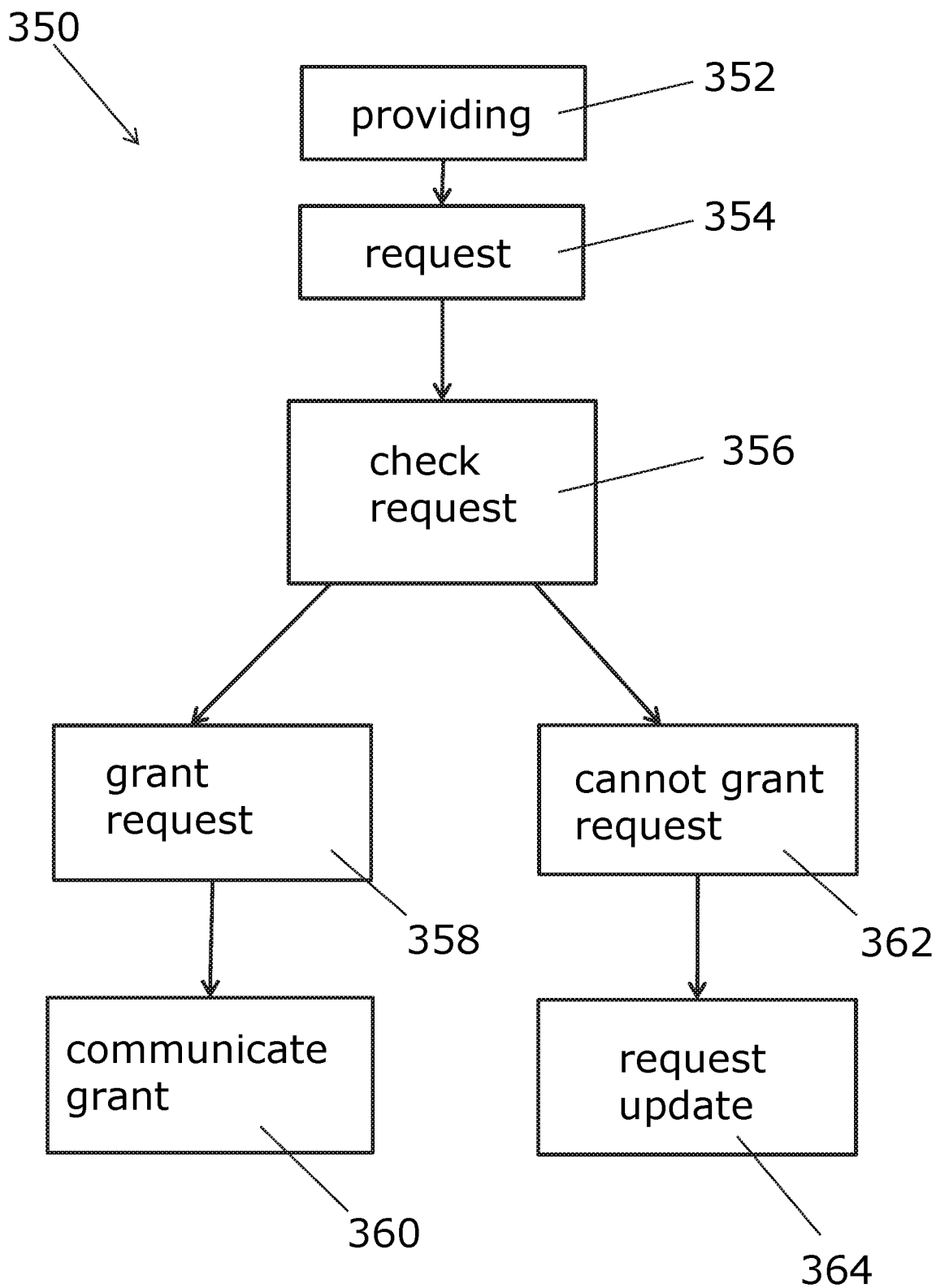
FIG. 3 is a flow chart illustrating a method for authorising user access to a component of a power plant within a private network.

FIG. 3 is a flow chart illustrating a method 350 for authenticating and authorising user access to a component 226, 228 of a power plant 222 within a private network 224 of a renewable power plant comprising one or more wind turbine generators, and wherein the method 350 comprises:

providing 352 at a local computer system 230 in the private network 224 a list of credentials representing a plurality of identifiers and authenticators of users and corresponding authorisations, the local computer system 230 being in direct communication with components 226, 228 of the power plant 222 and being configured to receive a request 354 for access from a user via a computer interface in the component 226, 228 in the private network 224;

checking 356 if the requested access can be granted by consulting the list of credentials and authorisations, and in case access can be granted 358, communicating 360 from the local computer system the grant to the computer interface in the component, and in case authorisation cannot be granted 362, communicating 364 a request for update of the list of credentials and authorisations at the local computer system 230 from the local computer system 230 to a central computer system 232 outside the private network 224.

Subsequent to updating the local computer system 230, it is checked if the requested authorisation can be granted by consulting the updated list of authorisation credentials 223 at the local computer system. If authorisation can be granted when consulting the updated list of credentials and authorisations 223, the local computer system 230 communicates the grant to the computer interface in the component 226, 228.

If the requested authorisation cannot be granted by consulting the updated list of credentials and authorisations 223, access may be denied. Alternatively, a new request for update of the list of credentials and authorisations at the local computer system 230 may be communicated from the local computer system 230 to the central computer system 232. If the requested access still cannot be granted by consulting the updated list of credentials and authorisations 223, access may be denied. Alternatively, a third request for update of the list of credentials and authorisations may be communicated. As an example, a request for update of the list of credentials and authorisations 223 at the local computer system may be communicated twice or three times before access is denied.

The invention claimed is:

1. A method for authenticating and authorizing user access to a component of a power plant within a private network of a renewable power plant comprising one or more wind turbine generators, wherein the method comprises:

providing at a local computer system in the private network a list of credentials and authorizations representing a plurality of identifiers and authenticators of users and corresponding authorizations, the local computer system being in direct communication with components of the power plant and being configured to receive a request for access from a user via a computer interface in the component in the private network;

in the event the requested access is granted by consulting the list of credentials and authorizations, communicating from the local computer system the grant to the computer interface in the component; and in the event the requested access is not granted, communicating a request for update of the list of credentials and authorizations at the local computer system from the local computer system to a central computer system outside the private network.

2. The method of claim 1, further comprising a step of updating the list of credentials and authorizations at the local computer system in response to the request from the local computer to the central computer system and a step of checking if the requested access can be granted by consulting the updated list of credentials and authorizations.

3. The method of claim 2, wherein access is denied, if the requested access cannot be granted by consulting the updated list of credentials and authorizations.

4. The method of claim 1, further comprising a step of requesting updates to the list of credentials and authorizations from the local computer system to the central computer system in accordance with a time schedule.

5. The method of claim 1, wherein the central computer system is configured for communication with a plurality of local computers systems, each being provided in a private network of separate renewable power plants, the central computer system comprising credentials and authorizations for each of the plurality of local computer systems, wherein the step of communicating a request for update of the list of credentials and authorizations at a specific local computer system comprises a step of filtering of credentials at the central computer system to comprise credentials for the specific private network only.

6. The method of claim 1, wherein the step of requesting access via a computer interface in the component is communicated to a single local computer system in the private network, the single local computer system being configured for handling access to all access restricted component of the renewable power plant.

7. The method of claim 1, wherein the step of updating the list of credentials and authorizations can only be effectuated upon a request from the local computer system.

8. The method of claim 1, wherein the central computer system is encompassed in a second private network of an external data centre.

9. The method of claim 1, wherein the step of communicating the request from the local computer system to the central computer system is carried out at least partly via a public network.

10. The method of claim 2, further comprising a step of validity testing the updated list of credentials and authorizations.

11. A system comprising:
a power plant comprising:
one or more wind turbine generators; and
a private network;
a local computer system placed within the private network; and
a central computer system arranged outside the private network;
wherein the system is arranged for carrying out an operation of authenticating and authorizing user access to a component within the private network of the power plant, wherein the operation comprises:
providing at a local computer system in the private network a list of credentials and authorizations representing a plurality of identifiers and authenticators of users and corresponding authorizations, the local computer system being in direct communication with components of the power plant and being configured to receive a request for access from a user via a computer interface in the component in the private network;
in the event the requested access is granted by consulting the list of credentials and authorizations, communicating from the local computer system the grant to the computer interface in the component; and
in the event the requested access is not granted, communicating a request for update of the list of credentials and authorizations at the local computer system from the local computer system to a central computer system outside the private network.

12. The system of claim 11, wherein the operation further comprises:
receiving, by the local computer system from the central computer system in response to the request for update of the list of credentials and authorizations, an updated list of credentials and authorizations; and
checking if the requested access can be granted by consulting the updated list of credentials and authorizations.

13. The system of claim 12, wherein in the event the requested access is not granted by consulting the updated list of credentials and authorizations, the operation further comprises:
communicating a second request for update of the list of credentials and authorizations at the local computer system from the local computer system to the central computer system outside the private network;
receiving, by the local computer system from the central computer system in response to the second request for update of the list of credentials and authorizations, a second updated list of credentials and authorizations; and
checking if the requested access can be granted by consulting the second updated list of credentials and authorizations.

14. The system of claim 12, wherein the updated list of credentials and authorizations is specific to the private network in which the local computer system is arranged.

15. The system of claim 11, wherein the local computer system is the only computer system in the private network configured for handling access and authorization of the components of the power plant.

16. A memory storing a computer program product comprising instructions which, when executed by one or more computer processors, performs an operation of authenticating and authorizing user access to a component within a private network of a power plant, wherein the operation comprises:
providing at a local computer system in the private network a list of credentials and authorizations representing a plurality of identifiers and authenticators of users and corresponding authorizations, the local computer system being in direct communication with components of the power plant and being configured to receive a request for access from a user via a computer interface in the component in the private network;
in the event the requested access is granted by consulting the list of credentials and authorizations, communicating from the local computer system the grant to the computer interface in the component; and
in the event the requested access is not granted, communicating a request for update of the list of credentials and authorizations at the local computer system from the local computer system to a central computer system outside the private network.

17. The memory of claim 16, wherein the operation further comprises:
receiving, by the local computer system from the central computer system in response to the request for update of the list of credentials and authorizations, an updated list of credentials and authorizations; and
checking if the requested access can be granted by consulting the updated list of credentials and authorizations.

18. The memory of claim 17, wherein in the event the requested access is not granted by consulting the updated list of credentials and authorizations, the operation further comprises:
communicating a second request for update of the list of credentials and authorizations at the local computer system from the local computer system to the central computer system outside the private network;
receiving, by the local computer system from the central computer system in response to the second request for update of the list of credentials and authorizations, a second updated list of credentials and authorizations; and
checking if the requested access can be granted by consulting the second updated list of credentials and authorizations.

19. The memory of claim 17, wherein the updated list of credentials and authorizations is specific to the private network in which the local computer system is arranged.

20. The memory of claim 16, wherein the local computer system is the only computer system in the private network configured for handling access and authorization of the components of the power plant.

* * * * *